(12) United States Patent
O'Higgins et al.

(10) Patent No.: US 7,446,491 B2
(45) Date of Patent: Nov. 4, 2008

(54) INTELLIGENT POWER MANAGEMENT FOR ACTUATORS

(75) Inventors: John O'Higgins, Dundalk (IE); John Collins, Castleblaney (IE); Cathal Gallagher, Newry (IE)

(73) Assignee: ABB Ltd., Dublin (IE)

( * ) Notice: Subject to any disclaimer, the term of this patent is extended or adjusted under 35 U.S.C. 154(b) by 56 days.

(21) Appl. No.: 11/357,476

(22) Filed: Feb. 17, 2006

(65) Prior Publication Data
US 2006/0202648 A1 Sep. 14, 2006

Related U.S. Application Data

(60) Provisional application No. 60/656,080, filed on Feb. 24, 2005.

(51) Int. Cl.
*H02P 4/00* (2006.01)
(52) U.S. Cl. .......................... 318/34; 700/295; 700/286; 700/297; 700/293; 700/90; 323/275; 323/272; 323/271; 307/38; 361/23; 361/29; 174/43
(58) Field of Classification Search ................... 318/34, 318/50, 53, 68; 361/64, 68, 71, 75, 23, 29; 363/72; 713/340, 300; 700/295, 286, 297, 700/293; 323/275, 272, 271
See application file for complete search history.

(56) References Cited

U.S. PATENT DOCUMENTS

| 3,937,978 | A | * | 2/1976 | Owenby, Jr. ................ 307/41 |
| 4,772,977 | A | * | 9/1988 | Bottrell et al. .............. 361/23 |
| 5,191,520 | A | * | 3/1993 | Eckersley .................... 363/72 |
| 5,252,899 | A | * | 10/1993 | Kawamura et al. .......... 318/568 |
| 5,572,438 | A | * | 11/1996 | Ehlers et al. ................ 700/295 |
| 5,576,700 | A | * | 11/1996 | Davis et al. ................. 340/3.31 |
| 5,604,421 | A | | 2/1997 | Barnsley |
| 5,771,174 | A | | 6/1998 | Spinner et al. |

(Continued)

FOREIGN PATENT DOCUMENTS

EP 0 620 631 A 10/1994

(Continued)

OTHER PUBLICATIONS

Mertens, E. Gemeinsam Sind Sie Stark Paralleler Und Redundanter Betrieb Von Stromversorgungen, Electrotechnik, Vogel Verlag K.G., Wurzburg, DE, vol. 82, No. 3, Mar. 14, 2000.

(Continued)

*Primary Examiner*—Rita Leykin
(74) *Attorney, Agent, or Firm*—Michael M. Rickin; Paul R. Katterle; Michael C. Prewitt

(57) ABSTRACT

A system and method is disclosed for intelligent power management of actuators such as those used in papermaking. Multiple power supply units are connected to a common power bus. The power bus is connected at predetermined locations to a communications bus. The communications bus is connected in series with all of the actuators. The actuators are arranged in predetermined groups. A computing device determines if electrical power can be supplied to some or all of the actuators that are requesting simultaneous movement and if there is insufficient power for all such actuators the computing device issues permission for actuators to move based on a preselected criteria.

6 Claims, 5 Drawing Sheets

U.S. PATENT DOCUMENTS

| | | | |
|---|---|---|---|
| 6,008,971 A * | 12/1999 | Duba et al. | 361/64 |
| 6,404,326 B1 | 6/2002 | Timmerman et al. | |
| 6,633,802 B2 | 10/2003 | Sodoski et al. | |
| 6,651,178 B1 * | 11/2003 | Voegeli et al. | 713/300 |
| 7,152,174 B2 * | 12/2006 | Needham et al. | 713/340 |
| 7,159,129 B2 * | 1/2007 | Pincu et al. | 713/300 |
| 2002/0117980 A1 * | 8/2002 | Echols et al. | 318/34 |
| 2002/0135232 A1 * | 9/2002 | McMillan | 307/23 |
| 2004/0151304 A1 * | 8/2004 | George et al. | 379/413 |
| 2005/0136989 A1 * | 6/2005 | Dove | 455/572 |

FOREIGN PATENT DOCUMENTS

| | | |
|---|---|---|
| EP | 1 083 468 A2 | 8/2000 |
| EP | 1 478 072 A | 11/2004 |
| WO | WO 90/09050 A | 8/1990 |

OTHER PUBLICATIONS

Rockwell Automation, Inc.: "Devicenet Media - Design and Installation Guide", DNET-UM072C-EN-P, Jul. 2004, XP002384552.

Rockwell Automation, Inc.: "DEVICENET MEDIA - Media, Sensors and Distributed I/O" 1485-CG001A-En-P, Oct. 2000.

* cited by examiner

INTELLIGENT POWER MANAGEMENT FOR ACTUATORS

CROSS REFERENCE TO RELATED APPLICATION

This application claims the priority of U.S. provisional patent application Ser. No. 60/656,080 filed on Feb. 24, 2005, entitled "Intelligent Power Management For Actuators" the contents of which are relied upon and incorporated herein by reference in their entirety, and the benefit of priority under 35 U.S.C. 119(e) is hereby claimed.

FIELD OF THE INVENTION

This invention relates to actuators, such as those used on devices mounted on paper making machines and more particularly to the management of the electrical power for the actuators.

DESCRIPTION OF THE PRIOR ART

In the modern production of a sheet material such as paper, a continuous fiber/water slurry is formed as a moving web. The slurry is in a headbox and is deposited from the headbox through a long horizontal slit onto a perforated web or wire. As is described in U.S. Pat. No. 6,382,044 entitled "Actuator Having A Rotational Power Source", the disclosure of which is hereby incorporated herein by reference and is assigned to the assignee of the present invention, a long stainless steel bar or "slice lip" comprises the top of the slit opening.

Attached to the slice lip are a multiplicity of spindles or "slice rods" which are equally spaced across the slice lip. The opening or closing of the slice lip determines the paper density or "basis weight" of the paper transverse to the direction of wire travel. Each spindle has associated therewith an actuator, known as a slice lip actuator, that imparts a linear force to its associated spindle to thereby non-permanently deform the associated portion of the slice lip. As the slurry moves down the machine used to make the paper the water is removed to leave the fiber which forms the paper sheet.

U.S. patent application Ser. No. 11/063,512 ("the '512 Application") filed on Feb. 23, 2005 entitled "Actuator System For Use In Control Of A Sheet Or Web Forming Process", the disclosure of which is hereby incorporated herein by reference and is assigned to the assignee of the present invention and an assignee related to the present assignee, shows in FIG. 1 and describes various other actuator driven devices known as profilers that may also be used at various locations on the typical papermaking machine.

As can be appreciated, electrical power is needed to operate each actuator. The typical arrangement for supplying power to the actuators includes a multiplicity of power supply modules. As is shown in the block diagram of FIG. 5 herein, each module in the form of a PSU 50a to 50n supplies power to a predetermined number of actuators which are shown in FIG. 5 in block form as actuator bank 1 52a to actuator bank n 52n. Therefore, the failure of one or more power supply modules causes the actuator driven device to not function properly which has a direct effect on the quality of the paper made on the machine. Thus it is desirable to provide an arrangement for providing power to the actuators that allows the actuators to continue to function even if one or more power supply modules should fail.

The present invention solves the above problem by allowing for continued operation of an actuator system during failure of a single or multiple power modules.

SUMMARY OF THE INVENTION

A system for managing the actuation of a multiplicity of actuators each actuated by electrical power, said actuators arranged in two or more groups of actuators each having a predetermined number of actuators, said system comprising:
two or more power supply units connected to a common power bus; and
a communications bus connected in series to all of said actuators in all of said two or more groups of actuators, said common power bus connected to said communications bus at one or more predetermined locations to supply power to a predetermined number of said two or more groups of actuators.

A computer program product for managing the actuation of a multiplicity of actuators each actuated by electrical power, said actuators arranged in two or more groups of actuators each having a predetermined number of actuators, said computer program product comprising:
computer usable program code configured to monitor the power available from said two or more power supply units; and
computer usable program code configured to determine from said available power from said two or more power supply units how many of said multiplicity of actuators can be simultaneously actuated.

A method of managing the actuation of a multiplicity of actuators each actuated by electrical power, said actuators arranged in two or more groups of actuators each having a predetermined number of actuators, said method comprising:
monitoring the power available from said two or more power supply units; and
determining from said available power from said two or more power supply units how many of said multiplicity of actuators can be simultaneously actuated.

DETAILED DESCRIPTION

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, the present invention may take the form of a computer program product on a computer-usable or computer-readable medium having computer-usable program code embodied in the medium. The computer-usable or computer-readable medium may be any medium that can contain, store, communicate, propagate, or transport the program for use by or in connection with the instruction execution system, apparatus, or device and may by way of example but without limitation, be an electronic, magnetic, optical, electromagnetic, infrared, or semiconductor system, apparatus, device, or propagation medium or even be paper or other suitable medium upon which the program is printed. More specific examples (a non-exhaustive list) of the computer-readable medium would include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. may be.

Computer program code for carrying out operations of the present invention may be written in an object oriented programming language such as Java, Smalltalk, C++ or the like, or may also be written in conventional procedural programming languages, such as the "C" programming language. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Figure 1:
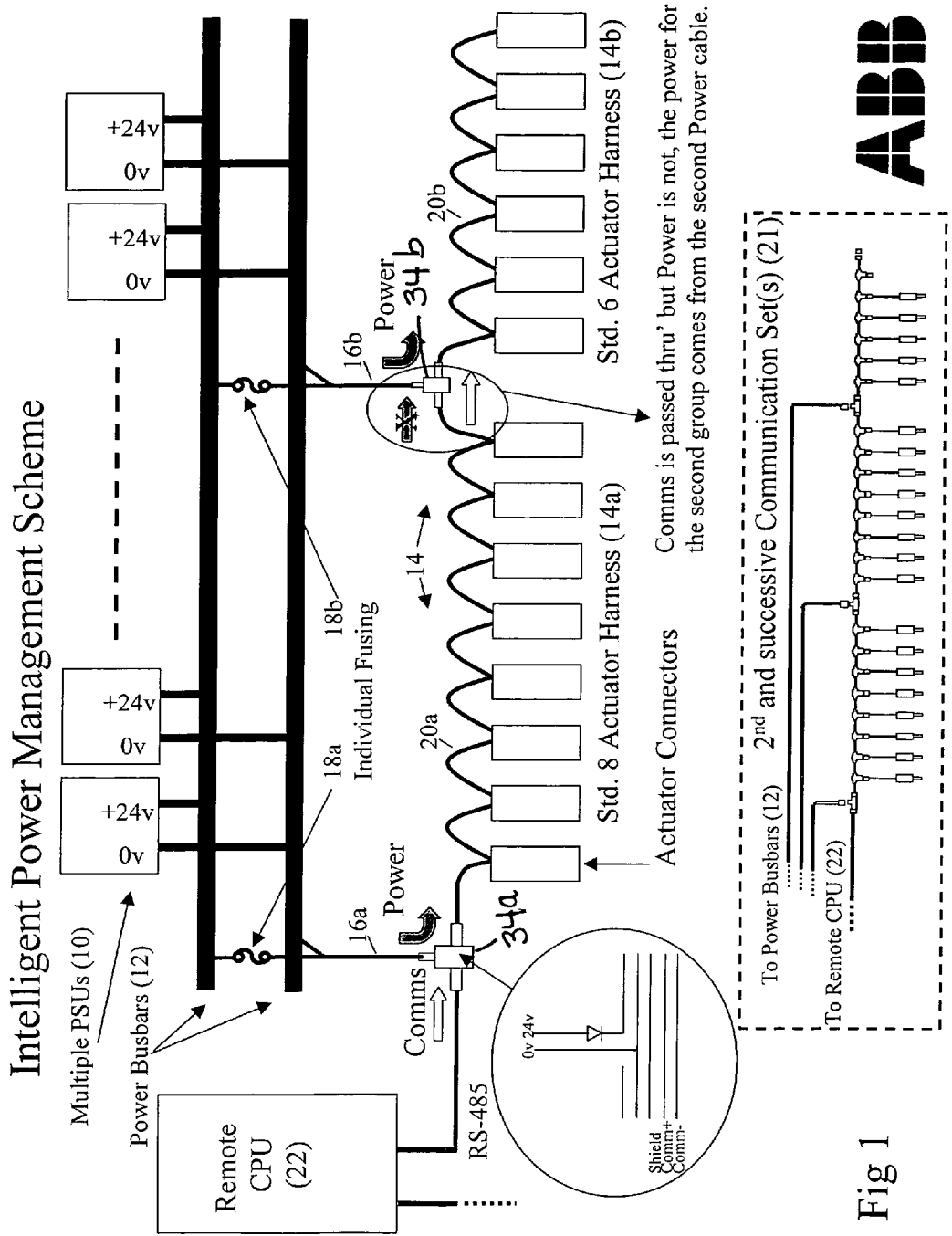
FIG. 1 shows the power management system of the present invention for two groups of actuators.

Referring now to FIG. 1, there is shown the actuator power management system of the present invention. As is shown in FIG. 1, all of the power supply units (PSUs) 10 are connected to a common power busbar 12, which in turn acts as a power reservoir for the entire system of multiple actuators 14. The PSU's 10 are of a type designed to be connected in parallel, i.e. they contain diodes so as to prevent the backflow of power from other working PSUs in the event of a failure of an individual PSU.

As is also shown in FIG. 1, actuators 14 are usually arranged in standard group sizes such as the eight actuators of group 14a or the six actuators of group 14b. It should be appreciated that while actuator group sizes having eight and six actuators are shown in FIG. 1 that other group sizes may be considered suitable for other actuator types or applications. It should also be appreciated that a typical headbox or profiler may have a hundred or more actuators and thus the two actuator groups 14a and 14b totaling 14 actuators is shown in FIG. 1 solely for the ease of illustration and additional groups of actuators may also be implemented using the same implementation scheme as is shown in FIG. 1 for groups 14a and 14b.

Power is distributed to the actuator groups 14a and 14b through multiple power cables 16a and 16b each of which have an associated fuse 18a and 18b, respectively. All or several of the actuator groups associated with a typical headbox or profiler are, as is shown in FIG. 1 for actuator groups 14a and 14b, connected in series to form a common communications bus(es) consisting of bus segments 20a and 20b. The power is injected onto this common bus from power cable 16a at device 34a and from power cable 16b at device 34b such that power is provided for the down line actuators up to the next power injection device. Thus, the power from cable 16a is injected at device 34a into the bus segment 20a to provide power for the eight actuators of group 14a and the power from cable 16b is injected at device 34b into the bus segment 20b downstream from the actuators of group 14a to provide power to the actuators of group 14b. Devices 34a and 34b are identical and the wiring for device 34a is shown in FIG. 1. Devices 34a and 34b are known as a Power Tee and are available as of the filing date of this application from InterlinkBT. Devices 34a and 34b may, or may not, include a diode, as indicated in the diagram, depending on requirements.

As can be appreciated, the next power injection cable location is dependant on the amount of power required by the intervening actuators and the rating of the cables used. For example as is shown in FIG. 2, if the power requirements of actuator groups 14a and 14b are low enough then the power cable 16a can supply power to both group of actuators with the power first passing through the actuators of group 14a and then to the actuators of group 14b.

Figure 2:
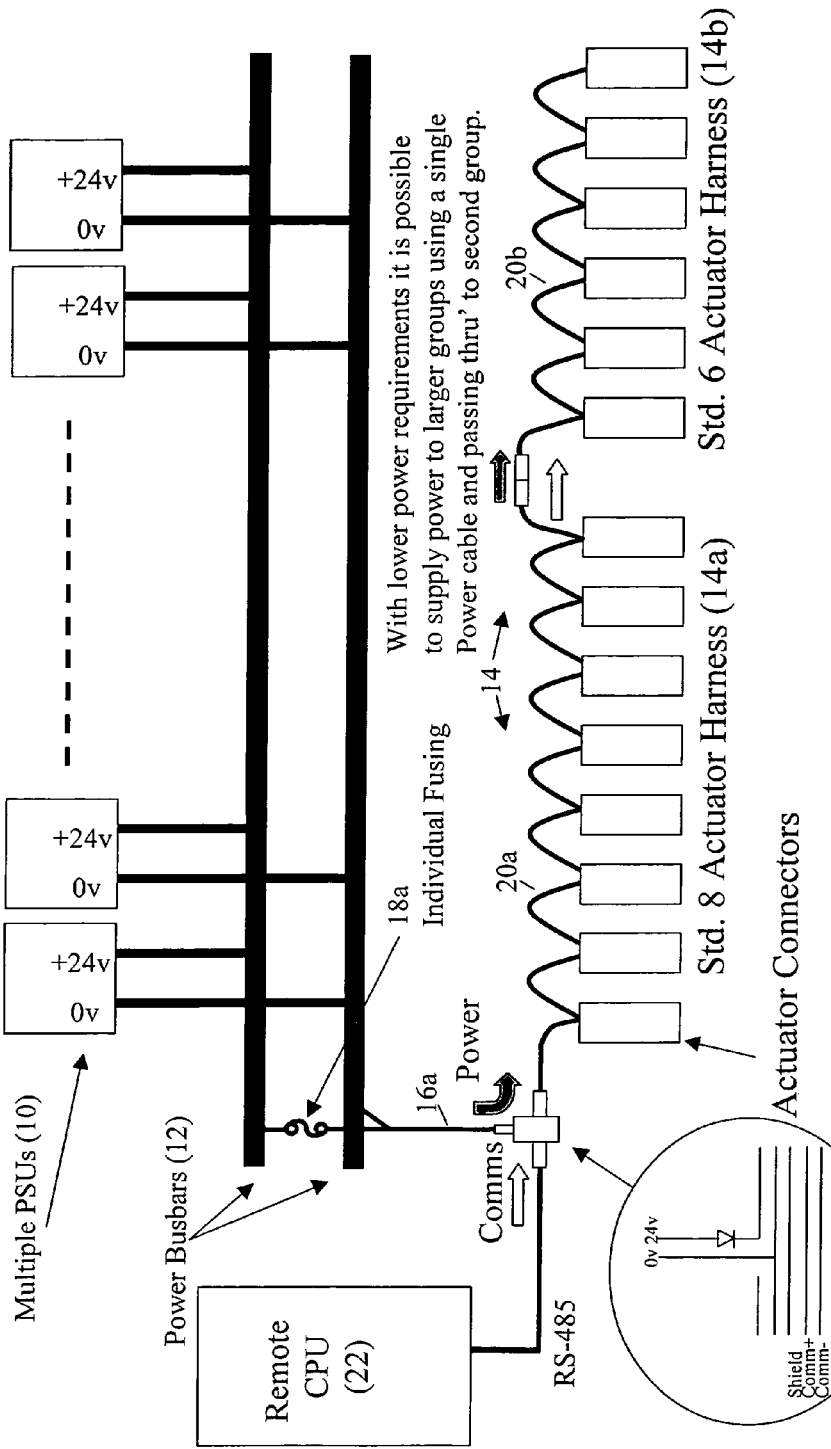
FIG. 2 shows the power management mechanism of the present invention for one power cable supplying electrical power to more than one group of actuators.

Thus, in accordance with the present invention, power may be passed through to the next group of actuators as is shown in FIG. 2 or may be supplied separately by breaking power connections and injecting power into the next group using an additional power cable and associated injector as shown in FIG. 1 for cable 16b and injector 34b.

The present invention is intended for use with actuators that have a low (or zero) standby (or holding) power usage but have much higher power requirements during actuation, resulting in a change to the actuators position or influence, for example, 20 mA at rest and 800 mA during actuation. A typical example of these actuator types are known to those of ordinary skill in the art as electro-mechanically actuated actuators.

Figure 3:
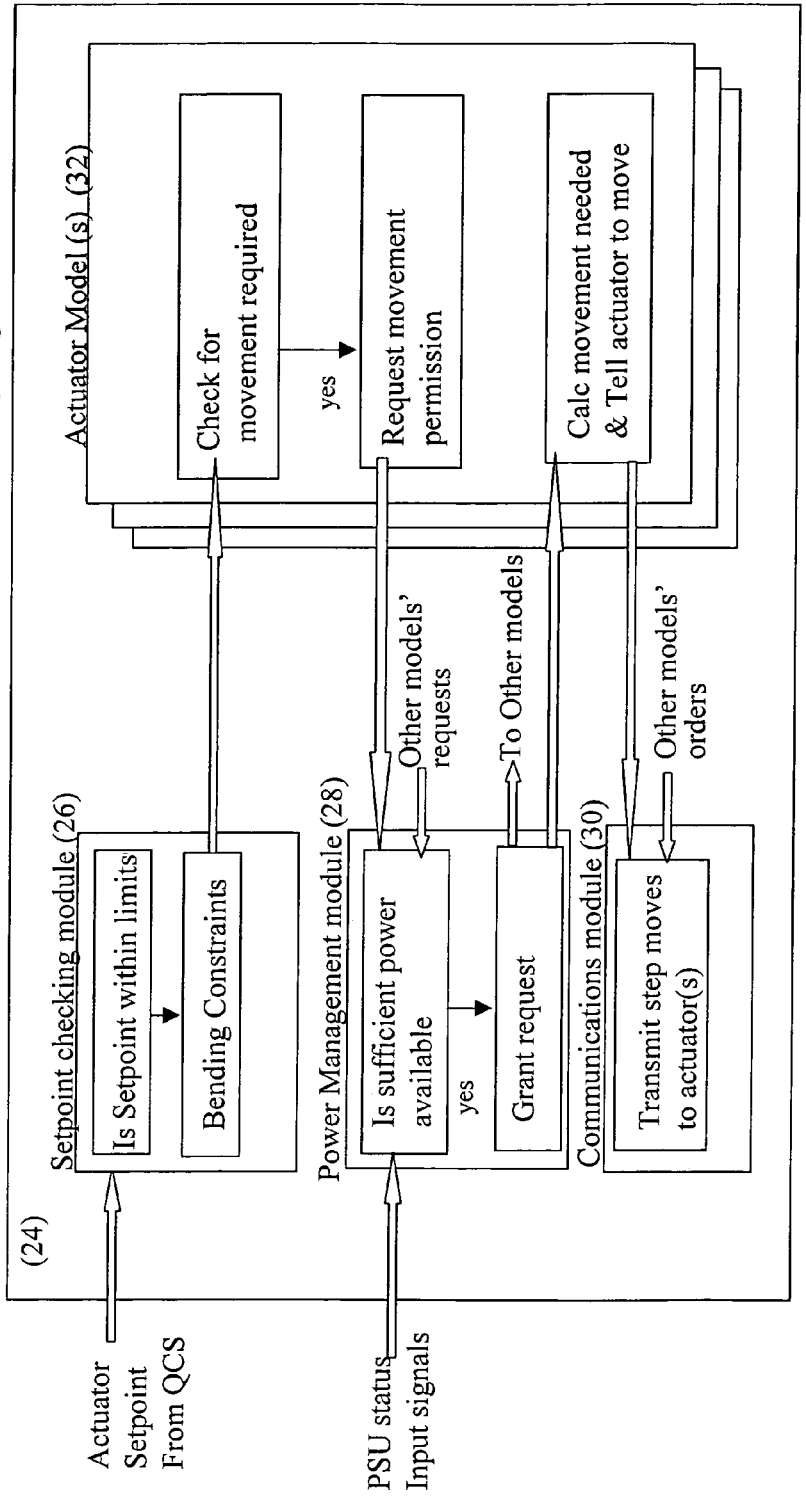
FIG. 3 is a flowchart of the method for the present invention.

As is shown in FIGS. 1 and 2, the actuator system of the present invention is controlled by a single processor unit (CPU) 22. As is shown in FIG. 3, CPU 22 in a typical arrangement contains an algorithm 24 that comprises a setpoint checking module 26, a power management module 28 and a communications module 30 which in combination actively monitors the available power and determines the number of actuators that can be actuated simultaneously. The setpoint module 26 may be omitted from the arrangement as it is not essential to the operation of the present invention. As FIG. 3 also shows, the CPU 22 also contains the models 32 that control the movements of the individual actuators. There is one model for each actuator.

The setpoint checking module 26 determines if the actuator setpoint is within limits. The module 26 receives the actuator setpoints from one or more quality control systems (QCSs) which are connected to a paper machine or other machine that has actuator driven devices. A further description of the connection of the one or more QCSs to the actuator driven devices is found in the '512 Application. The module 26 also determines if the desired setpoint would cause the actuator driven device such as a slice lip to exceed predetermined bending constraints. If not, the module 26 communicates with that part of the models 32 that checks for the movement required by individual actuators.

In response each of the models 32 request permission to move their associated actuator if they are deemed by the individual models 32 to require movement. It should be appreciated that not all of the actuators may require movement in response to a change in actuator setpoints from the QCS. As is shown in FIG. 3 and in more detail in FIG. 4, the models 32 in CPU 22 that control the movements of the individual actuators must request permission from the power management module 28 before each movement instruction is sent to an actuator. Thus the request for permission to move the actuators is communicated to the power management module 28. That module determines in combination with status signals from the PSUs 10 if sufficient power is available to move all of the actuators that must be moved in response to the actuator setpoints from the QCS. If sufficient power is available the module 28 grants the request and communicates that grant to the actuator models 32.

The models 32 then calculate the amount of movement and direction that is needed and generates commands to the actuators that when received by the actuators cause the associated actuator to move the desired amount. Those commands are communicated to the communications module 30 which in turn transmits the step move to the actuators.

Figure 4:
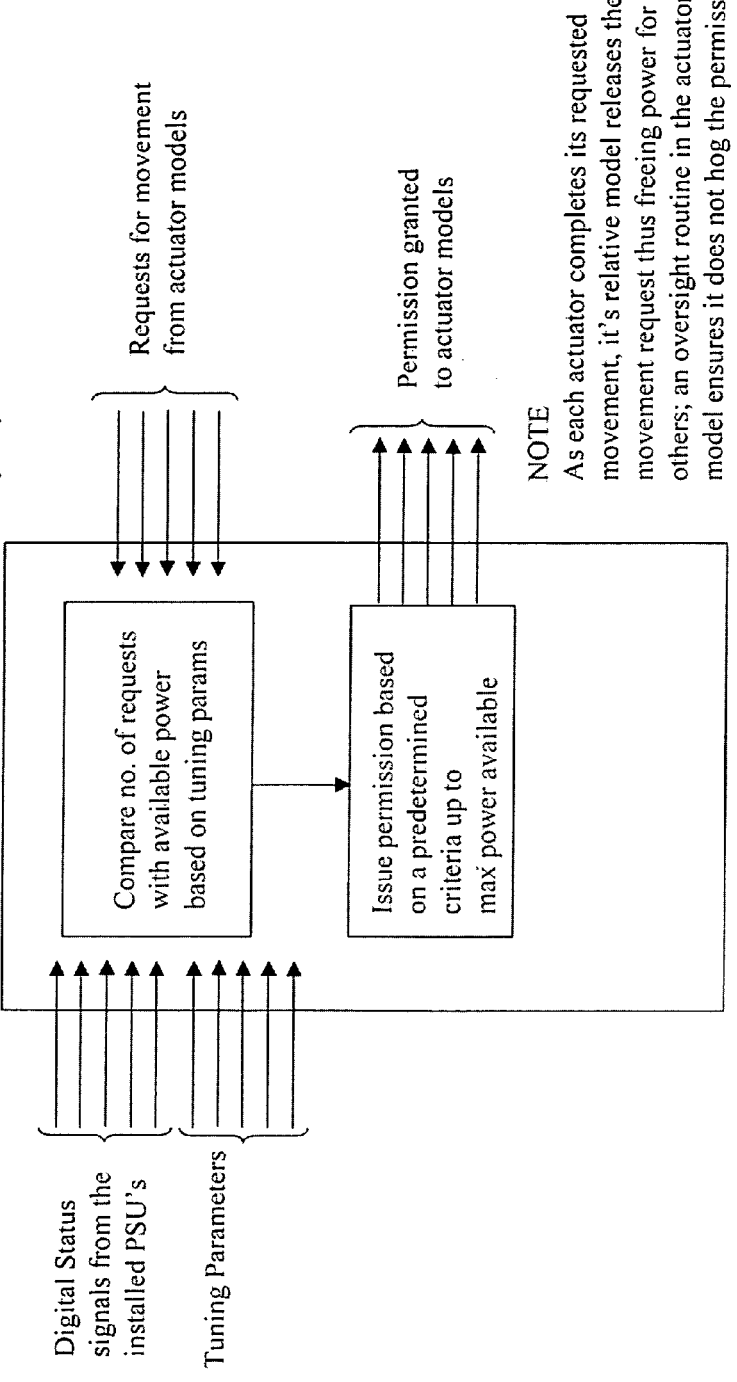
FIG. 4 is a flowchart showing more detail for the power management module shown in FIG. 3.
Figure 5:
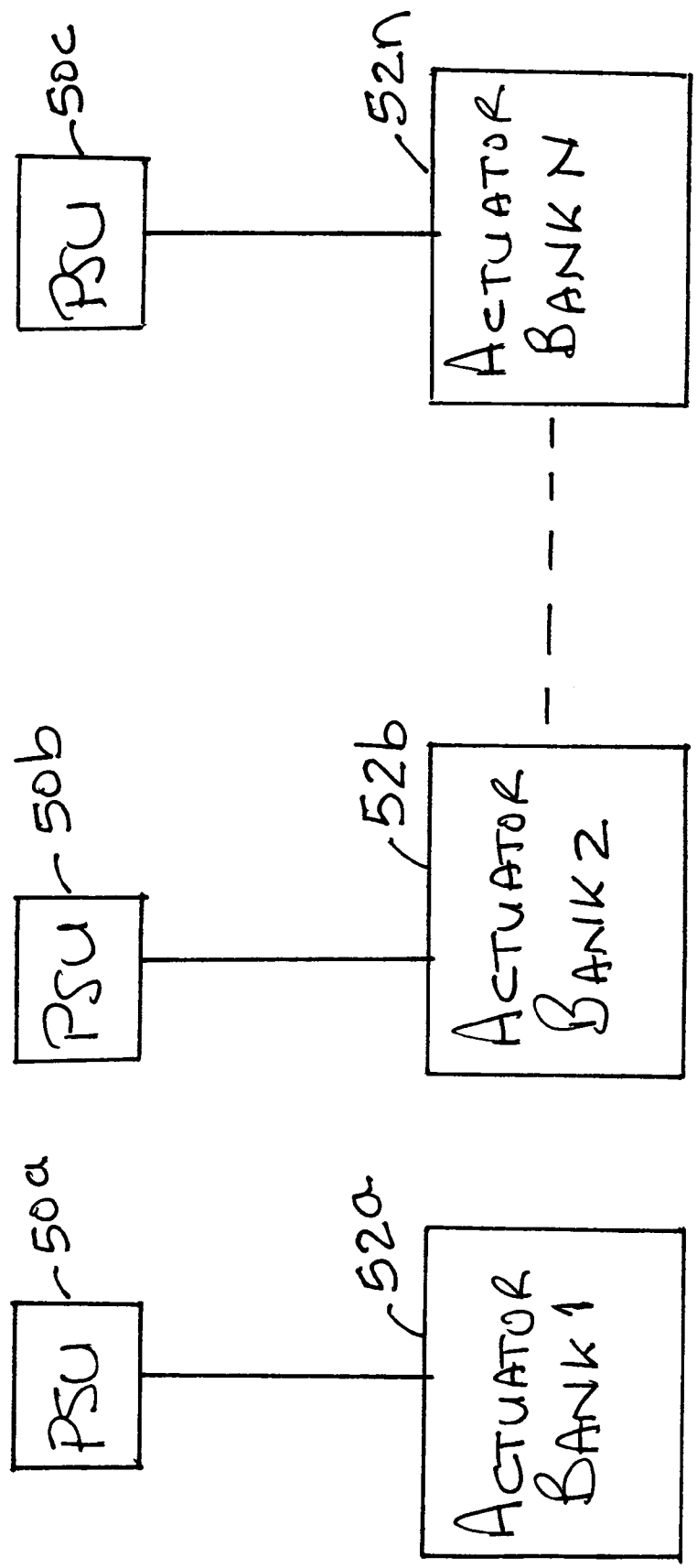
FIG. 5 is a simplified block diagram showing the typical prior art arrangement for supplying electrical power to a multiplicity of actuator groups.

Referring now to FIG. 4, there is shown more detail of how the power management module 28 in combination with the status signals from the PSUs 10 determines if there is sufficient power to move all of the actuators that must be moved and what happens if sufficient power does not exist at that time. As is shown in FIG. 4, the module 28 compares the number of requests for movement from the actuator models 32 with the available power based on the tuning parameters.

If there is not sufficient power to simultaneously honor all requests, the module 28 issues permission using a predetermined criteria up to the maximum available power and grants permission to the actuator models 32 as shown in FIG. 3. That criteria can be based upon first come, required movement amplitude, a priority level (fixed or calculated) or other criteria chosen using tuning parameters in the power management module 28. For example, in a situation where the system requires the simultaneous movement of 16 actuators, the power algorithm 28 reviews the available power and the movement requests. If power is available to move only 10 actuators simultaneously, the algorithm 28 issues permission to the models 32 to move the first 10 actuators that requested the power and only allow movement of the remaining six actuators after more power becomes available. It should be appreciated that the 16 actuators to be moved may only be a subset of the actuators forming the system and can be located anywhere on the head box and in any combination of groups as each actuator has its own model 32 and thus behaves independently of the other actuators.

Further as each actuator completes its requested movement, its associated model 32 releases the movement request. This frees power for the other actuators. An oversight routine in each actuator model 32 ensures that the model 32 does not keeping asking for permission once its actuator is deemed to have completed its movement.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A system for managing two or more groups of actuators each said group having a plurality of actuators, said system comprising:
   two or more power supply units connected to a first bus;
   a cable including two or more second bus segments, said cable connected in series to all of said actuators in all of said two or more groups of actuators, said first bus electrically connected to each said second bus segment, each said second bus segment supplying power to one of said two or more groups of actuators, said cable further includes one or more communication wires;
   a computing device communicating over said communication wires with said two or more groups of actuators; wherein said computing device comprises program code usable by said computing device, said program code comprising;
   code configured to determine, from a status signal from each of said two or more power supply units and the number of said actuators in each said group of actuators requiring movement, if sufficient power is available from said two or more power supply units to move all of said actuators requesting movement;
   code configured to generate commands to move all of said actuators requiring movement when it is determined that sufficient power is available to move all of said actuators requiring movement; and
   code configured to generate commands to simultaneously move less than all of said actuators requiring movement when it is determined that sufficient power is not available to move all of said actuators requiring movement, wherein said commands to move less than all of said actuators are queued in order according to a predetermined criteria.

2. A method of managing the actuation of a multiplicity of actuators each actuated by electrical power, said actuators arranged in two or more groups of actuators each having a predetermined number of actuators, said method comprising:
   providing two or more power supply units connected to a first power bus;
   monitoring the amount of power available from said two or more power supply units; and
   determining from a status signal from each of said two or more power supply units and the number of said multiplicity of actuators requiring movement, if sufficient power is available from the two or more power supply units to move all of said actuators requiring movement
   generating commands to move all of said actuators requiring movement when it is determined that sufficient power is available to move all of said actuators requiring movement; and
   generating commands to simultaneously move less than all actuators requiring movement if it is determined that sufficient power is not available to move all of said actuators requiring movement, wherein said commands to move less than all of said actuators are queued in order according to a predetermined criteria.

3. The system of claim 1 wherein said predetermined criteria is first in first out.

4. The system of claim 1 wherein said predetermined criteria is the required movement amplitude.

5. The method of claim 2 wherein said predetermined criteria is first in first out.

6. The method of claim 2 wherein said predetermined criteria is the required movement amplitude.

* * * * *